United States Patent [19]

Kanzaki et al.

[11] Patent Number: 5,420,491
[45] Date of Patent: May 30, 1995

[54] METHOD FOR CONSUMING REGENERATED POWER FOR ELEVATORS

[75] Inventors: Yuji Kanzaki, Kawasaki; Koji Yamada, Aichi, both of Japan

[73] Assignee: Otis Elevator Company, Farmington, Conn.

[21] Appl. No.: 984,648

[22] Filed: Dec. 2, 1992

[51] Int. Cl.⁶ .............................................. H02P 1/24
[52] U.S. Cl. ............................ 318/727; 318/812; 318/376
[58] Field of Search ................... 318/727, 812, 376

[56] References Cited

U.S. PATENT DOCUMENTS

| | | | |
|---|---|---|---|
| 4,695,938 | 9/1987 | Tada | 318/812 |
| 4,788,493 | 11/1988 | Liptak | 318/376 |
| 4,933,828 | 6/1990 | Ogawa et al. | 318/812 |
| 5,089,760 | 2/1992 | Joyner, Jr. | 318/812 |
| 5,194,797 | 3/1993 | Kahkipuro | 318/727 |
| 5,204,606 | 4/1993 | Kuwahara et al. | 318/800 |
| 5,208,524 | 5/1993 | Kono et al. | 318/727 |

*Primary Examiner*—William M. Shoop, Jr.
*Assistant Examiner*—Karen Masih

[57] ABSTRACT

An analog DC link bus voltage in an induction motor drive is converted to a digital DC link bus voltage so that if the DC link bus voltage exceeds an ON voltage threshold of a switch and this condition exists a holding time later, the switch closes, thereby allowing regenerated power in the DC link to be dissipated in a resistor connected across the DC link. And if the DC link bus voltage falls below an OFF voltage threshold and that condition exists a latching time later, the switch is opened so that no regenerated power may be dissipated through the resistor.

2 Claims, 4 Drawing Sheets

METHOD FOR CONSUMING REGENERATED POWER FOR ELEVATORS

TECHNICAL FIELD

This invention concerns a method of consuming in the inverter the regenerated power from the induction motor that drives the elevator.

BACKGROUND OF THE INVENTION

When the brake is applied during operation of an elevator with the induction motor (IM) driven by an inverter, the rotating speed of the motor is higher than the frequency of the inverter, and regenerated power is formed in the motor. As this regenerated power flows into the DC circuit of the inverter, a resistor in the DC circuit absorbs the regenerated power.

FIG. 3 shows the configuration of conventional regenerated power consumption. The principal circuit has converter (1) and inverter circuit (2). The three-phase AC is converted to DC by converter (1) and then converted to three-phase AC by inverter circuit (2). The speed of the IM (4) is controlled by the base driver (3).

A regenerated power consumption circuit composed of resistor (5) and switch (6) formed of semiconductor elements is inserted in parallel to the principal circuit. The DC voltage on the two ends of principal circuit capacitor (7) is detected by a voltage detector (8). The signal from said voltage detector (8) is input to a hysteresis comparator (9). The magnitude of the DC voltage is the basis for ON/OFF control of a base driver (10) of switch (6). Thus, the regenerated power formed in the deceleration of the IM (4) can be consumed by resistor (5).

FIG. 4 shows the DC voltage waveform of the principal circuit in the aforementioned operation. As can be seen with respect to the DC voltage of the principal circuit, switch ON level and switch OFF level of said regenerated power consumption switch (6) are set by the comparator (9). As the DC voltage rises with the regenerated power, the circuit is turned ON, the regenerated power is thus consumed; then as the DC voltage falls, the circuit is turned OFF.

When used for an elevator, as shown in FIG. 5, the elevator has an IM (4) as the power source, a cage (12), and a balance weight (13) loaded on winding drum (11). The velocity pattern for acceleration, deceleration, and constant velocity is generated by a control unit (14) so that the cage (12) may be stopped on any floor.

The maximum load depends on the number of passengers in the cage, etc. Because the number of passengers can change, there can be a large regenerated power in the case of deceleration.

In addition, the deceleration rate depends on the velocity pattern and the regenerated power varies, depending on the number of passengers.

Even in the case of constant velocity operation, when the cage (12) is heavier than the balance weight (13) due to more passengers, regenerated power is formed in the descending stage. On the other hand, when the cage (12) is lighter than the balance weight (13), the regenerated power takes place in the rising stage. These regenerated power levels also vary as the number of passengers changes.

As explained above, the regenerated power of the elevator depends on the number of passengers and the operation status—whether deceleration or constant velocity. Consequently, for hysteresis comparator (9), the switching frequency and the ON/OFF ratio also depend on the change in the regenerated power. This dependency makes the design of the regeneration circuit complicated. To realize reliable operation for switch (6), a switch which allows high-speed switching operation up to several kHz must be used. In addition, it is difficult to design the hysteresis width and ON/OFF operation level of the hysteresis comparator (9) and to set the resistance value of resistor (5).

DISCLOSURE OF THE INVENTION

An object of the present invention is regeneration of power in an IM drive using a switch having a low switching speed.

In this way, even when the regenerated power varies, the switching speed is limited by the frequency determined by the time constant of the filter; the switching speed needed by the switch can be set by the time constant of the filter, and any type of switch element can be used.

An advantage is that since the filter has a software configuration, the setting can be changed easily, and the circuit design may be realized by selecting the time constant of the filter and the resistance value.

These and other objects, features and advantages of the present invention will become more apparent in light of the following detailed description of a best mode embodiment thereof, as illustrated in the accompanying drawing.

An analog DC link bus voltage in an induction motor drive is converted to a digital DC link bus voltage so that if the DC link bus voltage exceeds an ON voltage threshold of a switch and this condition exists a holding time later, the switch closes, thereby allowing regenerated power in the DC link to be dissipated in a resistor connected across the DC link. And if the DC link bus voltage falls below an OFF voltage threshold and that condition exists a latching time later, the switch is opened so that no regenerated power may be dissipated through the resistor.

BEST MODE FOR CARRYING OUT THE EMBODIMENT

Figure 1:
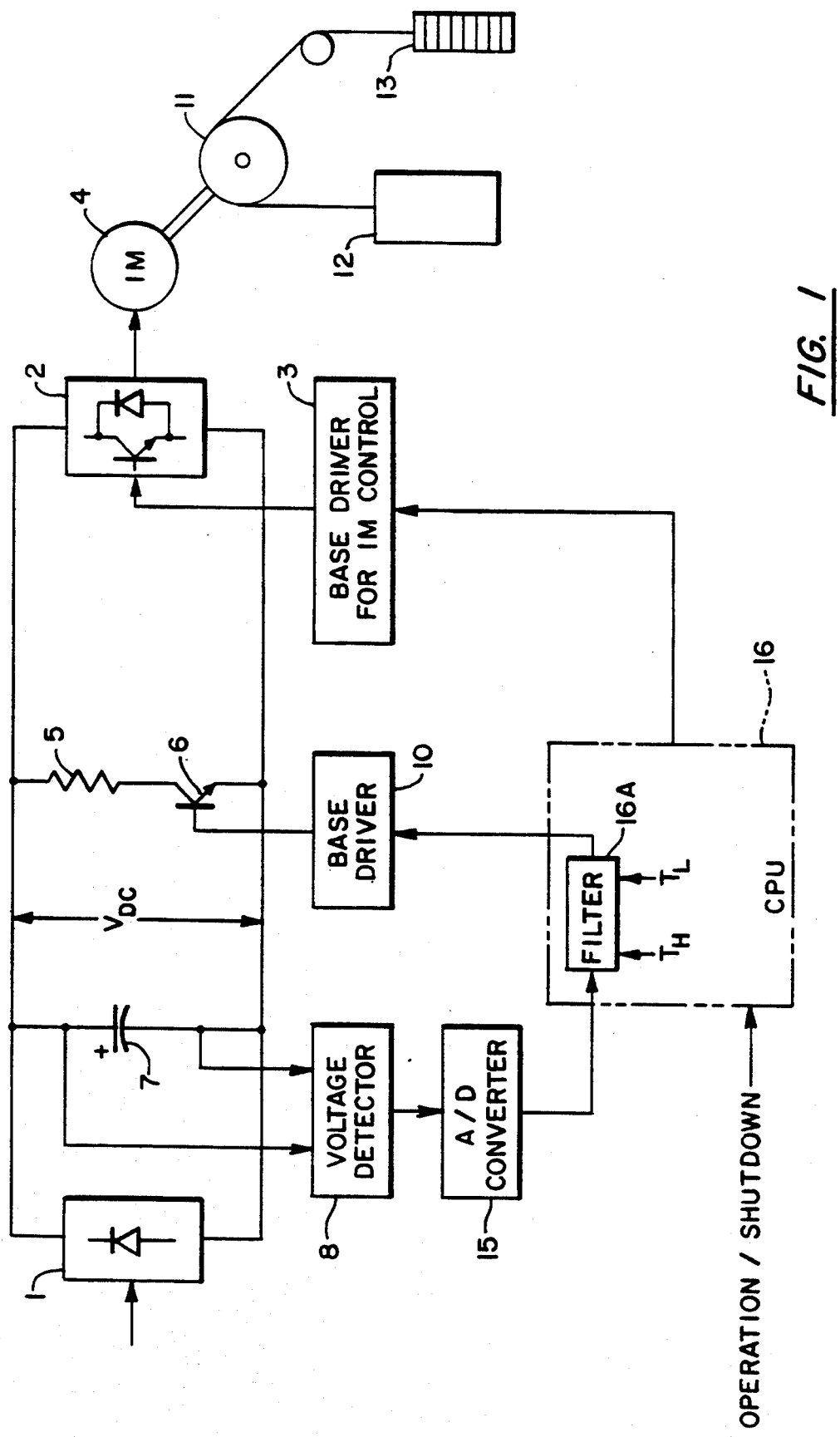
FIG. 1 shows the configuration of an application example of this invention.
Figure 3:
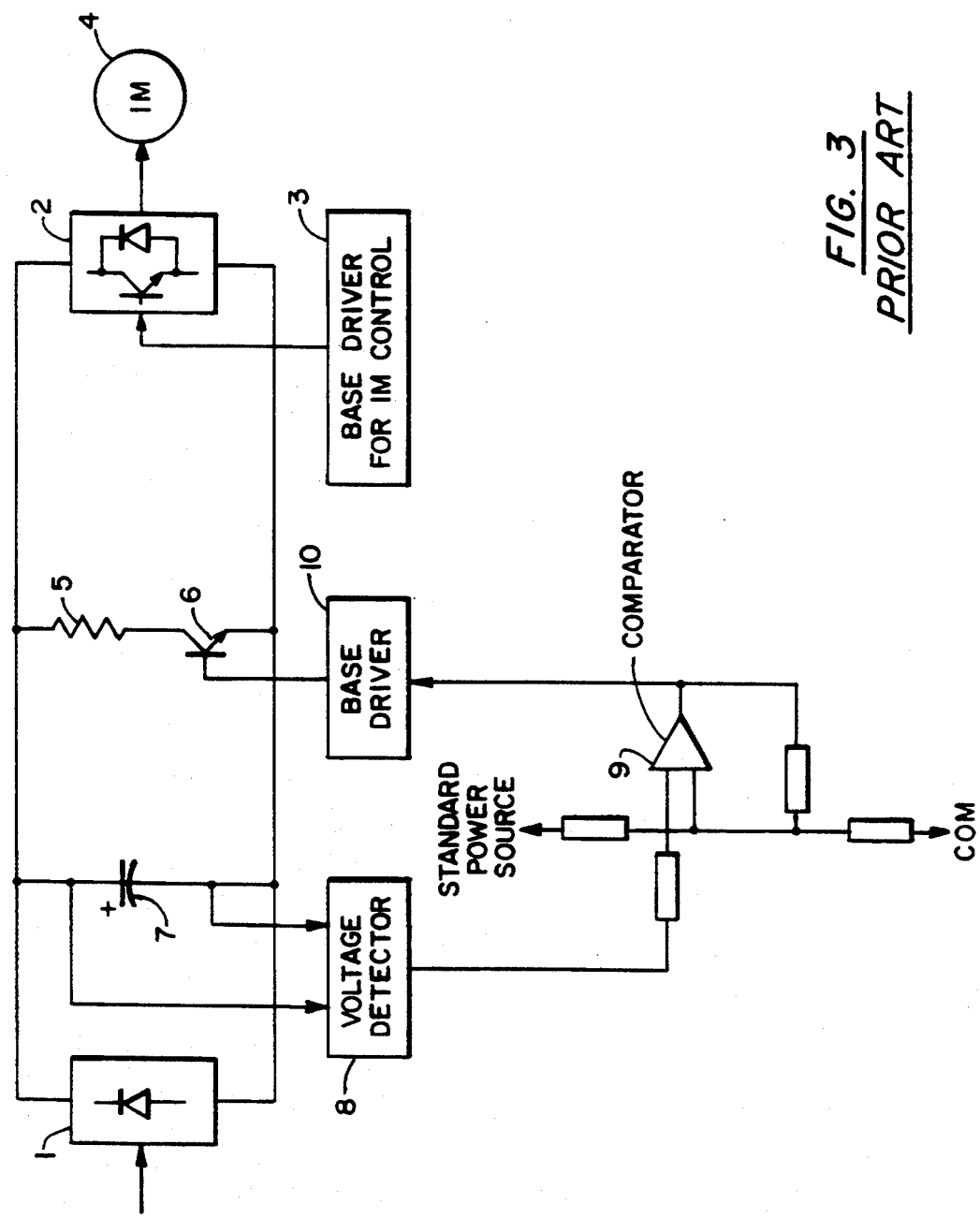
FIG. 3 shows the configuration of a conventional scheme.
Figure 5:
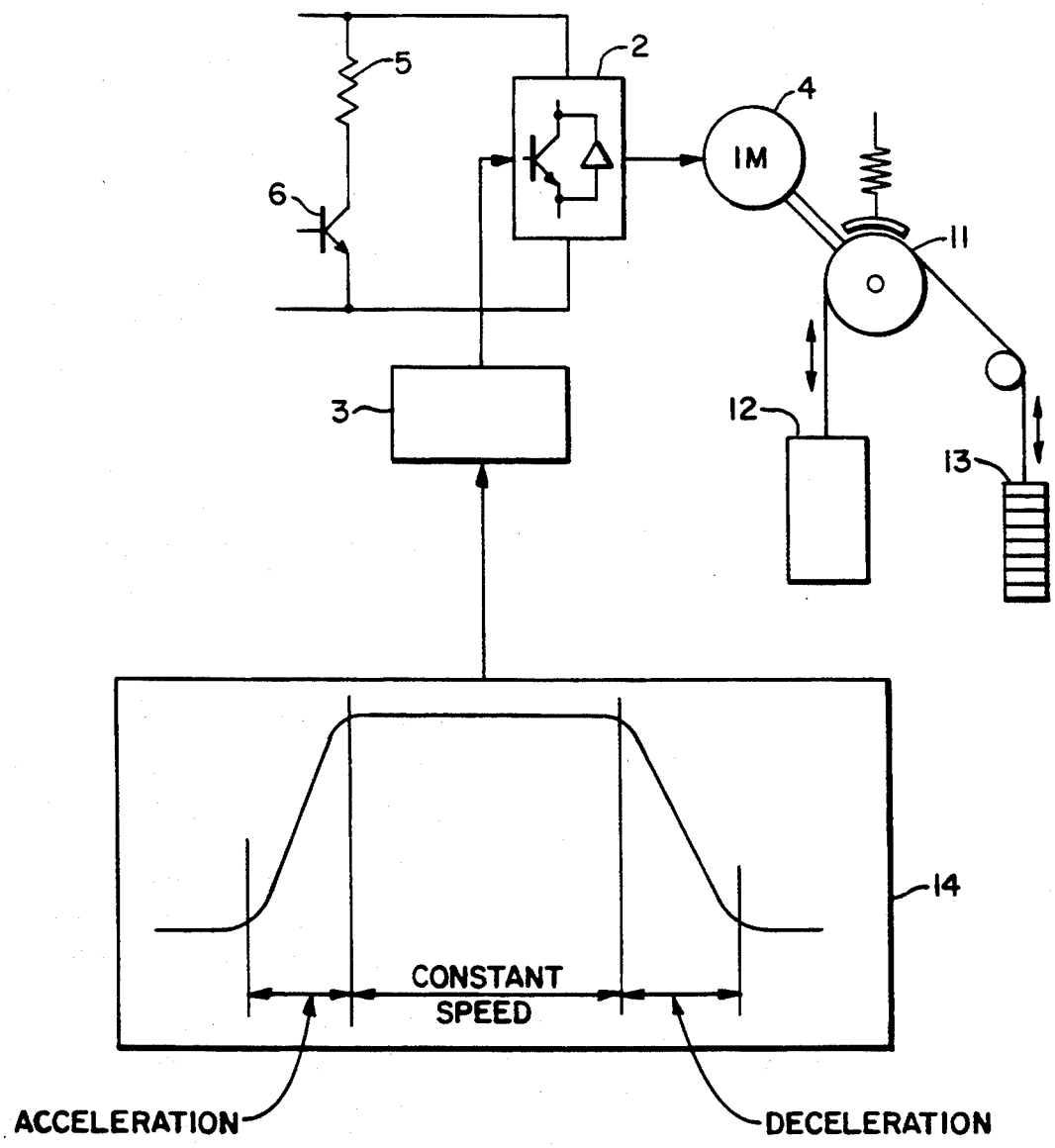
FIG. 5 shows the configuration of the elevator.

FIG. 1 illustrates the invention. The configuration shown in FIG. 1 differs from those shown in FIGS. 3 and 5 in the following respects: (a) the detected signal of voltage detector (8) is converted to the digital signal by an A/D converter (15), and (b) the digital signal is filtered by filter (16A) in control unit (16) which has a CPU configuration. The output of the filter (16A) is the ON/OFF control signal for base driver (1).

Filter (16A) has a CPU software configuration. With respect to the sampling data of DC voltage, $V_{dc}$ is modified according to the following formula: (Formula 1)

$$V_{dc}(n) = \frac{V_s - V_{dc}(n-1)}{(1 + T/dt)} + V_{dc}(n-1)$$

where
$V_{dc}(n)$: modified data
$V_s$: sampling input
$V_{dc}(n-1)$: data of last round
T: time constant of filter
dt: sampling time interval That is, suppose the sampling time dt is 10 ms and the filter time constant T is 30 ms, (1+T/dt) then becomes 4. Now, as ¼ of the difference between default sampling $V_s$ and last-round data $V_{dc}(n-1)$ is added/subtracted, the modified data $V_{dc}(n)$ is delayed by the time constant T of the filter. Since the modified data $V_{dc}(n)$ with the aforementioned delay is used to make ON/OFF switching for base driver (1), the timing is delayed and the switching frequency of switch (6) is limited by the time constant of the filter.

For example, when DC voltage $V_{dc}$ rises above the ON line (FIG. 2) and a prescribed time has passed after the OFF operation (the filter's time constant), switching is made from OFF to ON and the switching frequency is decreased. Due to the ON operation of switch (6), the regenerated power is consumed by resistor (5).

On the other hand, switching of filter (16A) from OFF to ON may be carried out in any of the following cases:

(1) when troubles take place, such as insufficient voltage, overvoltage, overcurrent, etc.;

(2) when DC voltage $V_{dc}$ drops below the OFF level, and after a prescribed time (filter time constant) from ON operation; and (3) when stop command is generated and the inverter is shut off.

For above items (1) and (3), the operation is realized as controller (16) handles the output frequency and operation state of the inverter and the state of the input sequence.

Figure 2:
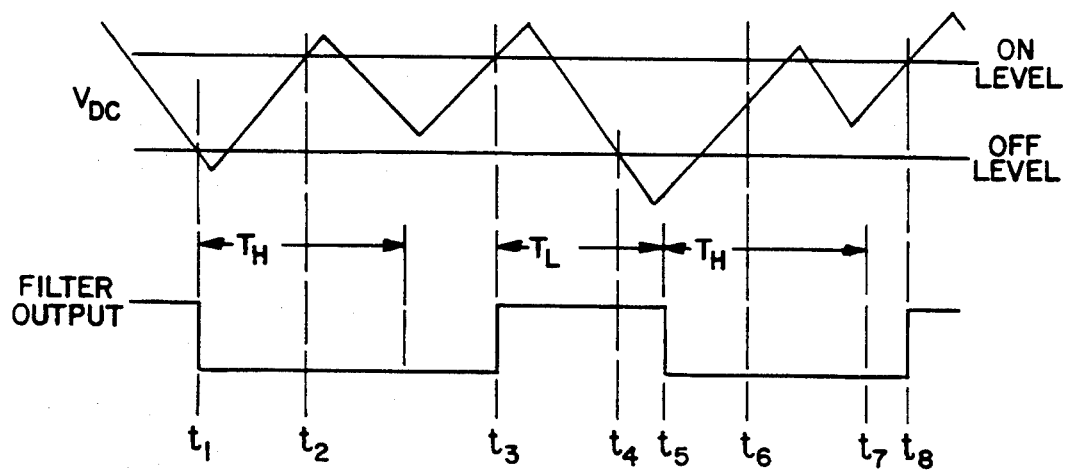
FIG. 2 shows the filter operation waveform in the application example.
Figure 4:
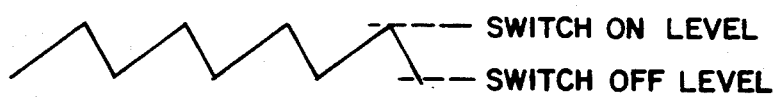
FIG. 4 shows the voltage waveforms of the conventional principal circuit.

For the regenerated power consumption operation with the aforementioned configuration, as can be seen in FIG. 2 from the filter output waveform with respect to DC voltage $V_{dc}$, the maximum switching frequency is determined by the times $T_H$, $T_L$ corresponding to the filter time constant.

As shown in FIG. 2, when DC voltage $V_{dc}$ first falls below the OFF level set at filter (16A) (at time $t_1$) and then exceeds the ON level at time $t_2$, since the time interval between $t_1$ and $t_2$ is shorter than a prescribed time $T_H$, the output of filter (16A) does not produce an ON operation, and the OFF operation is continued.

When DC voltage $V_{dc}$ exceeds ON level at time $t_3$, since the time interval between $t_1$ and $t_3$ exceeds the prescribed time $T_H$, the filter output performs ON operation.

Similarly, when DC voltage $V_{dc}$ falls below OFF level at time $t_4$, since the time interval is shorter than a prescribed time $T_L$ (it may be identical to or different from $T_H$), there is no OFF operation; the OFF operation takes place at time $t_5$.

Also, when DC voltage $V_{dc}$ exceeds ON level at time $t_6$, as the time interval from $t_5$ to $t_6$ is shorter than a prescribed time $T_H$, there is no ON operation, while the ON operation takes place at time $t_8$.

Consequently, for filter (16A), the switching frequency is limited by times $T_H$, $T_L$ set in the software, and therefore the maximum switching frequency for the regenerated power consumption can be controlled by times $T_H$, $T_L$. For example, when times $T_H$ and $T_L$ are set at 30 ms, the maximum switching frequency is 33.33 Hz, and the regenerated power consumption can be performed by using switch (6) with a switching speed on the level of the frequency.

As described above, the control of the regenerated power consumption is not limited to the case of deceleration of the elevator, it may also be performed corresponding to the variation in the regenerated power generated due to a difference in the number of passengers and whether the car is ascending or descending in the constant speed mode. The time constant of the filter can be set in the software, and the filter (16A) itself can be simplified by using a software configuration.

In the aforementioned example, switch (6) and resistor (5) for the regenerated power consumption are arranged as a single circuit. However, it is also acceptable to use a configuration of multiple circuits with a selective switch operation. In this scheme, even in the case when the variation amplitude of the regenerated power is abnormally large and the switching operation of the maximum switching frequency cannot be limited by the time constant of filter (16A), the multiple circuits can perform a parallel ON operation when an overvoltage for DC voltage $V_{dc}$ is predicted; hence, overvoltage can be prevented. On the other hand, when an insufficient voltage is predicted, the insufficient voltage can be prevented by the ON/OFF control of one circuit.

As explained in the above, according to this invention, the regenerated power consumption is performed by detecting the DC voltage of the inverter, with the DC voltage of detection being then filter-treated by a filter with a software configuration; the maximum switching frequency of the switch is set by the time constant of the filter; and the filter time constant is set corresponding to the switching speed of the switch, so as to ensure the regenerated power consumption.

It should be understood by those skilled in the art that various changes, omissions, and additions may be made herein without departing from the spirit and scope of the invention.

We claim:

1. A method for dissipating power regenerated from an induction motor, comprising the steps of:
    detecting the voltage on a DC bus linking an AC-to-DC converter to a DC-to-AC inverter that drives said motor, and providing a voltage signal indicative thereof;
    filtering said voltage signal to provide a control signal when said voltage signal exceeds a predetermined ON threshold magnitude for a predetermined holding time and to cease providing said control signal when said DC link bus voltage falls below a predetermined OFF threshold magnitude for a predetermined latching time; and
    connecting said voltage on said DC bus to a power dissipating resistor in response to said control signal.

2. Apparatus for dissipating regenerated power generated from an induction motor back through an inverter, comprising:
    means for detecting the voltage on a DC bus linking an AC-to-DC converter to said inverter and providing a voltage signal indicative thereof;
    a resistor;
    a switch for connecting said resistor to said bus; and a switch drive means, including a filter responsive to said voltage signal for closing said switch when said voltage signal exceeds a predetermined ON threshold magnitude for a predetermined holding time $T_H$, thereby causing the power in said DC link to be dissipated through said resistor and for opening said switch when said voltage signal falls below a predetermined OFF threshold magnitude for a predetermined latching time $T_L$ such that no regenerated power is dissipated through said resistor.

* * * * *